US007797008B2

(12) United States Patent
Crisler et al.

(10) Patent No.: US 7,797,008 B2
(45) Date of Patent: Sep. 14, 2010

(54) METHOD AND APPARATUS FOR REDUCING ACCESS DELAY IN PUSH TO TALK OVER CELLULAR (POC) COMMUNICATIONS

(75) Inventors: Kenneth J. Crisler, Lake Zurich, IL (US); Ramesh Sudini, Lake Zurich, IL (US); Lawrence A. Willis, McHenry, IL (US)

(73) Assignee: Motorola, Inc., Schaumburg, IL (US)

( * ) Notice: Subject to any disclaimer, the term of this patent is extended or adjusted under 35 U.S.C. 154(b) by 755 days.

(21) Appl. No.: 11/513,488

(22) Filed: Aug. 30, 2006

(65) Prior Publication Data

US 2008/0057993 A1    Mar. 6, 2008

(51) Int. Cl.
*H04B 7/00* (2006.01)

(52) U.S. Cl. ............... 455/518; 455/519; 455/416; 455/418; 455/90.2; 455/67.13; 370/260; 370/352

(58) Field of Classification Search ........ 455/518, 455/519, 418, 90.2, 67.13, 3.05, 567, 412.1, 455/414.1, 416, 422.1, 458; 370/260, 261, 370/352, 389; 379/202.01
See application file for complete search history.

(56) References Cited

U.S. PATENT DOCUMENTS

| 6,134,450 | A * | 10/2000 | Nordeman | 455/517 |
| 6,999,432 | B2 * | 2/2006 | Zhang et al. | 370/328 |
| 2002/0032788 | A1 * | 3/2002 | Emanuel et al. | 709/230 |
| 2003/0115320 | A1 | 6/2003 | Yarroll et al. | |
| 2004/0100940 | A1 | 5/2004 | Kuure | |
| 2004/0156354 | A1 * | 8/2004 | Wang et al. | 370/352 |
| 2005/0099990 | A1 | 5/2005 | Uusikartano et al. | |
| 2006/0034336 | A1 * | 2/2006 | Huh et al. | 370/498 |
| 2006/0045071 | A1 | 3/2006 | Vimpari et al. | |
| 2006/0146805 | A1 * | 7/2006 | Krewson | 370/352 |

FOREIGN PATENT DOCUMENTS

| EP | 0986206 A1 | 3/2000 |
| EP | 1349147 | 10/2003 |
| EP | 1503548 | 2/2005 |
| WO | 0145374 | 6/2001 |

OTHER PUBLICATIONS

Samsung, "Delay Analysis of PoC Session Establishment", Agenda Item 9.3, Meeting in Montreal, Canada, Aug. 16-20, 2004.

* cited by examiner

*Primary Examiner*—Matthew D Anderson
*Assistant Examiner*—Shaima Q Aminzay
(74) *Attorney, Agent, or Firm*—Ingrassia, Fisher & Lorenz, P.C.

(57) ABSTRACT

A method and apparatus for reducing access delay in push-to-talk (PTT) over Cellular (PoC) communication sessions is provided in a wireless communication device (120) including a quality level controller (230) which controls the quality level at which the transmit talkburst controller (226) provides talkbursts to transmitter circuitry (206). A processor (208) signals the quality level controller (230) and the transmit talkburst controller (226) to provide a first talkburst to the transmitter circuitry (206) for transmitting at a first quality level (310), and thereafter signals the quality level controller (230) to adjust the quality level from the first quality level to a second quality level (314) so that the transmit talkburst controller (226) will provide at least one subsequent talkburst to the transmitter circuitry (206) for transmitting at the second quality level (316).

22 Claims, 5 Drawing Sheets

METHOD AND APPARATUS FOR REDUCING ACCESS DELAY IN PUSH TO TALK OVER CELLULAR (POC) COMMUNICATIONS

FIELD OF THE INVENTION

The present invention generally relates to wireless communication systems, and more particularly relates to a method and apparatus for reducing access delay for Push To Talk (PTT) over Cellular (PoC) communications.

BACKGROUND OF THE INVENTION

Push To Talk (PTT) over Cellular (PoC) is a new service being deployed in cellular networks. One of the intrinsic values of PTT communications is rapid ("instant") call setup. Nextel, using iDEN technology, has made Direct Connect (PTT) the cornerstone of their unique service offerings. However, to date, most implementations of PoC have suffered from very long access delays, thus making the communications anything but "instant".

Most PoC implementations take the approach of transporting the voice over packet data channels. Packet data service in systems such as the Global System for Mobile communications (GSM) and the Universal Mobile Telecommunications System (UMTS) is governed by the notion of Packet Data Protocol (PDP) contexts. The PDP context defines the IP address and the Quality of Service (QoS) class for a data session. UMTS defines four distinct QoS classes: background, interactive, streaming and conversational. Interactive class QoS is appropriate for the signalling portion of PoC service, while streaming or conversational QoS is preferred for the audio portion of PoC due to their tighter transfer delay requirements. However, establishing a streaming or conversational media PDP context can add significantly to the call setup delay.

Thus, what is needed is a method and apparatus for managing PDP contexts that meets QoS requirements for the PoC conversation while simultaneously reducing the impact on access delay. Furthermore, other desirable features and characteristics of the present invention will become apparent from the subsequent detailed description of the invention and the appended claims, taken in conjunction with the accompanying drawings and this background of the invention.

SUMMARY OF THE INVENTION

It should be appreciated that this Summary is provided to introduce a selection of exemplary non-limiting concepts which are more fully disclosed below. A method for providing talkbursts for transmitting during communication sessions is provided. The method comprises providing a first talkburst for transmitting at a first quality level, adjusting a quality level from the first quality level to a second quality level, and then providing at least one subsequent talkburst for transmitting at the second quality level.

The subject matter disclosed here in also provides for a wireless communication device that comprises receiver circuitry for receiving talkbursts that generates radio frequency signals for transmission from the wireless communication device. The wireless communication device also includes a transmit talkburst controller that which generates talkbursts for transmission by the transmitter circuitry to which it is connected and a quality level controller that is also coupled to the transmit talkburst controller which controls a quality level at which the transmit talkburst controller provides the talkbursts to the transmitter circuitry. A processor is included that is coupled to all of the transmit talkburst controller, the quality level controller and the transmitter circuitry. The processor signals the quality level controller and the transmit talkburst controller to provide a first talkburst to the transmitter circuitry for transmitting at a first quality level, and thereafter signaling the quality level controller to adjust the quality level from the first quality level to a second quality level so that the transmit talkburst controller will provide at least one subsequent talkburst to the transmitter circuitry for transmitting at the second quality level.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

A method for providing talkbursts for transmitting during communication sessions includes the steps of providing a first talkburst for transmitting at a first quality level, adjusting a quality level from the first quality level to a second quality level and providing at least one subsequent talkburst for transmitting at the second quality level.

A wireless communication device includes transmitter circuitry, a transmit talkburst controller, a quality level controller and a processor. The transmitter circuitry receives talkbursts and generates radio frequency signals therefrom for transmission from the wireless communication device. The transmit talkburst controller is coupled to the transmitter circuitry and generates the talkbursts for provision thereto. The quality level controller is coupled to the transmit talkburst controller and controls the quality level at which the transmit talkburst controller provides the talkbursts to the transmitter circuitry. And the processor is coupled to the transmit talkburst controller, the quality level controller and the transmitter circuitry and signals the quality level controller and the transmit talkburst controller to provide a first talkburst to the transmitter circuitry for transmitting at a first quality level, and thereafter signals the quality level controller to adjust the quality level from the first quality level to a second quality level so that the transmit talkburst controller will provide at least one subsequent talkburst to the transmitter circuitry for transmitting at the second quality level.

Figure 1:
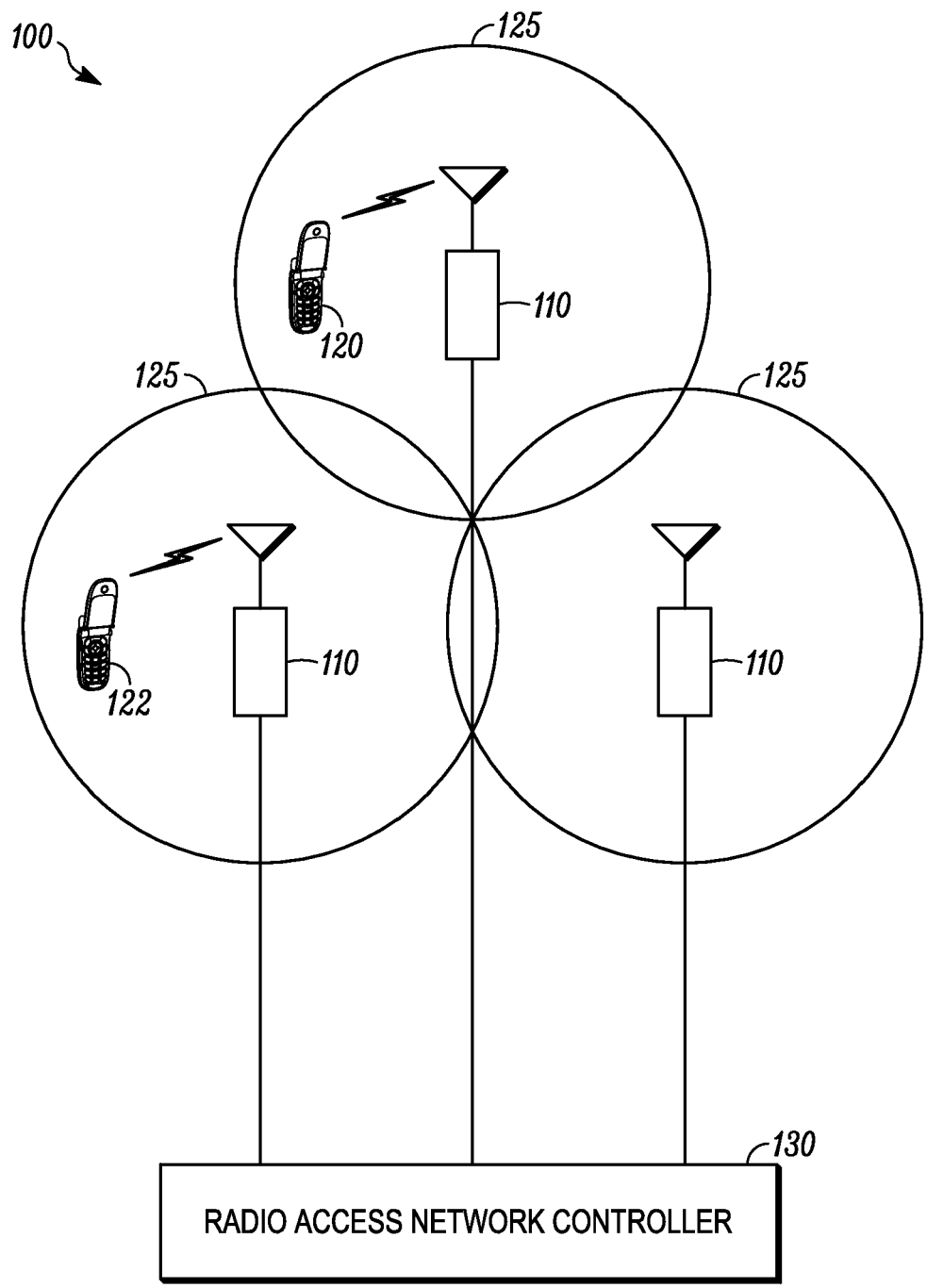
FIG. 1 is a block diagram of a wireless communication system in accordance with an embodiment of the present invention.

The following detailed description of the invention is merely exemplary in nature and is not intended to limit the invention or the application and uses of the invention. Furthermore, there is no intention to be bound by any theory presented in the preceding background of the invention or the following detailed description of the invention.

Referring to FIG. 1, a wireless communication system 100 in accordance with an embodiment of the present invention includes a plurality of base stations 110 and wireless communication devices 120, 122. The plurality of base stations 100 communicate with the wireless communication devices 120, 122 via radio frequency (RF) signals. Associated with each of the plurality of base stations 110 is a coverage area or cell 125 wherein the wireless communication devices 120, 122 can receive signals from and transmit signals to such one of the plurality of base stations 110.

The plurality of base stations 110 are coupled to a radio access network controller 130 for control of communications in the wireless communication system 100. For example, in a manner well known to those skilled in the art, the wireless communication device 120 could place a call to the wireless communication device 122 by transmitting appropriate RF signals to the base station 110 corresponding to the cell 125 in which the wireless communication device 120 is located. The base station 110 signals the network controller 130, setting up a logical connection, called a radio bearer, between the wireless communication device 120 and the network controller 130 which, among other information, identifies the target wireless communication device 122 for the call. The network controller 130 signals the base station 110 corresponding to the coverage area 125 wherein the wireless communication device 122 is located. In response to the wireless communication device 122 accepting the call, the network controller 130 sets up the call, coupling the two base stations 110 together therethrough.

Figure 2:
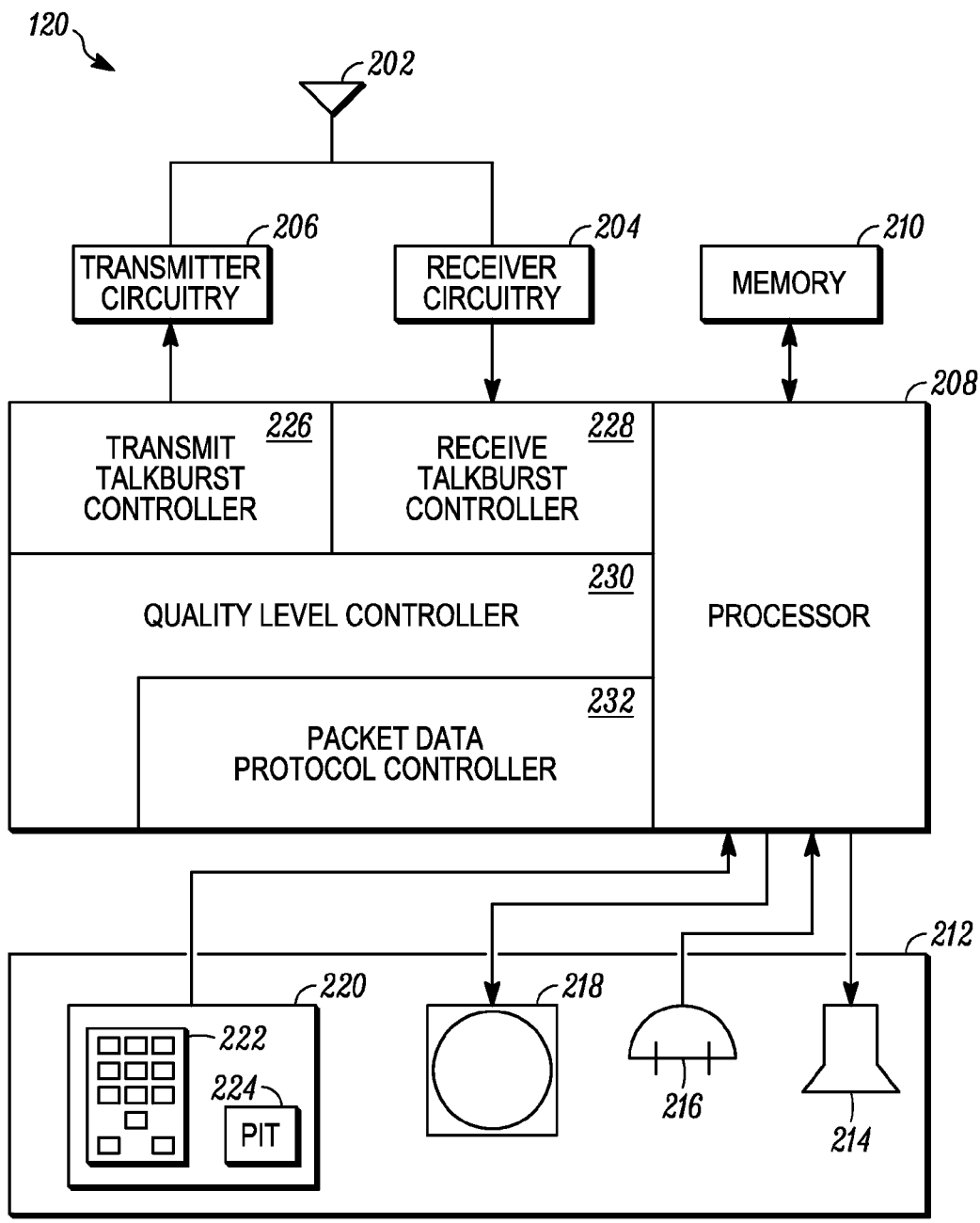
FIG. 2 is a block diagram of a wireless communication device of the communication system of FIG. 1 in accordance with the embodiment of the present invention.

Referring to FIG. 2, a wireless communication device 120, 122 in accordance with the embodiment of the present invention is shown. As the wireless communication devices 120, 122 are similarly constructed in accordance with the embodiment of the present invention, hereinafter reference is made solely to wireless communication device 120 for convenience. The wireless communication device 120 includes an antenna 202 for receiving and transmitting RF signals. The antenna 202 is coupled to receiver circuitry 204 and transmitter circuitry 206 in a manner familiar to those skilled in the art. The receiver circuitry 204 demodulates and decodes the RF signals received from the base stations 110 (FIG. 1) to derive information therefrom and is coupled to a processor 208 for providing the decoded information thereto for utilization thereby in accordance with the function(s) of the wireless communication device 120. The processor 208 also provides information to the transmitter circuitry 206 for encoding and modulating information into RF signals for transmission from the antenna 202.

As is well-known in the art, the processor 208 is typically coupled to a memory device 210 and a user interface 212 to perform the functions of the wireless communication device 120. The user interface 212 includes a speaker 214, a microphone 216 and a display 218 which may be designed to accept touch screen inputs. The user interface 212 also includes one or more key inputs 220, including a keypad 222 and a Push To Talk (PTT) key or button 224. The PTT button 224 is given a form factor, such as designed taller than the other key inputs 222, so that a user can easily access the PTT button 224. As to functionality, the PTT button 224 provides the user a single keypress to initiate a predetermined application or function of the wireless communication device 120. In accordance with the present invention, a Push To Talk over Cellular (PoC) application in the processor 208 operates under the control of the PTT button 224.

The wireless communication device 120 can communicate with other wireless communication devices 120 in the radio access network managed by the radio access network controller 130. In accordance with the embodiment of the present invention, the wireless communication device 120 can communicate in systems such as Global System for Mobile communications (GSM) and Universal Mobile Telecommunications System (UMTS) where information can be exchanged in the form of talkbursts, each talkburst formed of Packet Data Protocol (PDP) information. To form the talkbursts for providing to the transmitter circuitry 206, the processor 208 includes a transmit talkburst controller 226. For decoding talkbursts received from the receiver circuitry 204 to recover information therefrom, the processor 208 includes a receive talkburst controller 228.

GSM, UMTS and other telecommunication systems support four Quality of Service (QoS) classes for PDP contexts: background, interactive, streaming and conversational. Background and interactive classes are suitable for non-realtime reliable data exchanges whereas streaming and conversational classes have tighter delay requirements appropriate for real-time services. To control the QoS of the transmitted talkbursts and to control the QoS at which received talkbursts are decoded, a quality level controller 230 is coupled to the transmit talkburst controller 226 and the receive talkburst controller 228.

Packet data services in systems such as the GSM and UMTS utilize the notion of PDP contexts. A PDP context defines the IP address and the QoS class for a data session and There may exist primary PDP contexts and secondary PDP contexts. The primary PDP context is a default context used for most of the data communicated between two nodes. A secondary PDP context is associated with the same IP address, but is typically defined to have a different QoS specific to one or more classes of data (i.e. protocols) exchanged between the nodes. For example, in a PoC session, it may be advantageous to use a primary PDP context for signaling and a secondary PDP context for media such as voice packets.

The quality level controller includes a PDP controller 232 for establishing the primary and secondary PDP contexts for the various media in accordance with the QoS classes' quality levels. While PDP contexts may be active without associated radio bearers, since streaming and conversational classes have a guaranteed bit rate, they can only be active without radio bearers in a sort of dormant state where the guaranteed bit rate is zero kilobits per second (0 kbps). Thus, PDP contexts must necessarily be created at call setup. However, establishing PDP contexts and associated radio bearers for call setup can be time-consuming. Therefore, such tasks must be managed carefully to reduce call setup delay for a real-time service. This is especially true in PoC communication setup wherein call setup is rapid and, preferably, instant.

Establishing radio bearers for primary and secondary PDP contexts requires less time if both the primary and the secondary PDP contexts are interactive. However, establishing a streaming or conversational QoS class for the secondary PDP context for call setup would lead to better call QoS. In general, it is preferable to use an interactive PDP context for Session Initiation Protocol (SIP) signaling and a streaming or conversational PDP context for PoC media. However, establishing a separate streaming or conversational context adds significantly to the access delay during call setup.

While a typical PoC conversation will consist of multiple talkbursts, the radio bearer establishment issue is only relevant for the first talkburst (assuming that later talkbursts come prior to radio bearer timeout). Thus, in accordance with the present invention, the processor 208 manages the quality level controller 230, the transmit talkburst controller 226 and the receive talkburst controller 228 such that the first talkburst is optimized for access delay and subsequent talkbursts are optimized for quality by controlling the PDP controller 232 to use an interactive class context as either the primary context or a pre-established secondary context for media on the first talkburst and then modifying the media context to either the streaming or conversational class during the pause between the first and subsequent talkbursts. In this manner, operation in accordance with the present invention takes advantage of normal human conversational flow to hide the delay associated with establishing the preferred QoS in the pause between the first talkburst and subsequent talkbursts.

As described above, the transmit talkburst controller 226, the receive talkburst controller 228 and the quality level controller 230 operate under the control of the processor 208. Accordingly, the transmit talkburst controller 226, the receive talkburst controller 228 and the quality level controller 230 could be enabled in hardware controllers coupled to the processor 208 for operation or, as shown in FIG. 2, could be enabled in software within the processor 208.

Figure 3:
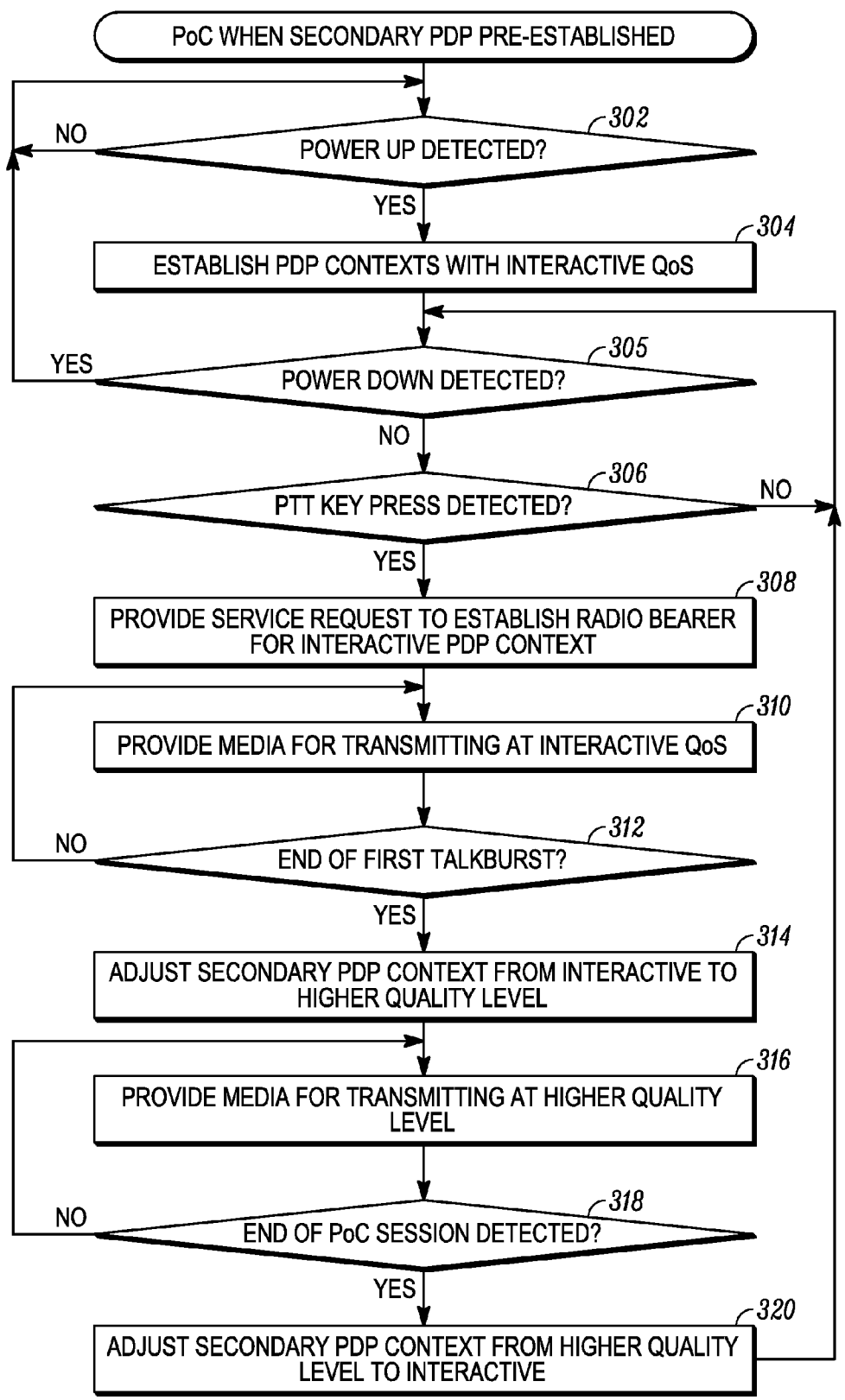
FIG. 3 is a flowchart of the operation of the processor of the wireless communication device when initiating a push-to-talk (PTT) over cellular (PoC) session in accordance with the embodiment of the present invention when the secondary packet data protocol (PDP) context is pre-established.

Referring to FIG. 3, a flowchart of the operation of the processor 208 of the wireless communication device 120 when powering up and when initiating a PoC session when the secondary PDP context is pre-established in accordance with the embodiment of the present invention begins by the processor 208 detecting when the wireless communication device 120 powers up 302. When power up is detected 302, the processor 208 signals the quality level controller 230 to establish the QoS class of service for the PDP contexts (primary and secondary) at an interactive quality level 304. Thereafter, processing awaits either detection of the wireless communication device 120 powering off 305 or initiation of a PoC session 306.

When the processor 208 detects a keypress 306 of the PTT key 224 indicating the initiation of a PoC session wherein audio conversation will be provided in talkbursts at the pre-established secondary PDP context, the processor 208 provides information to the transmitter circuitry 206 to provide a service request to establish a radio bearer for an interactive secondary PDP context communication 308 and provides information to the transmit talkburst controller 226 to transmit media in the first talkburst on the secondary context (i.e., at the interactive quality level) 310. The media is provided to the transmit talkburst controller 226 for transmission 310 until the end of the first talkburst is detected 312.

When the end of the first talkburst is detected 312, operation of the processor 208 in accordance with the present invention signals the quality level controller 230 to adjust the quality level (e.g., the QoS) of the secondary context from the interactive quality level to a predetermined higher quality level (such as the streaming quality level or the conversational quality level) in the time interval between transmitting the first talkburst and transmitting the second talkburst 314. Thereafter, the information is provided to the transmit talkburst controller 226 to transmit media in the second and subsequent talkbursts at the higher quality level 316 until the end of the PoC conversation is detected 318. In this manner, operation in accordance with the present invention takes advantage of initial pauses in natural conversational progression to establish the preferred QoS in the time interval between the first and subsequent talkbursts by optimizing the first PoC talkburst to prevent access delay and optimizing subsequent talkbursts for quality.

When the end of the PoC session is detected 318, the processor 208 signals the quality level controller 230 to adjust the PDP secondary context from the streaming or conversational quality level to the interactive quality level 320 and processing awaits either a detection of the wireless communication device 120 being powered off 305 or a keypress of the PTT key 224 indicating the initiation of another PoC session 306.

Figure 4:
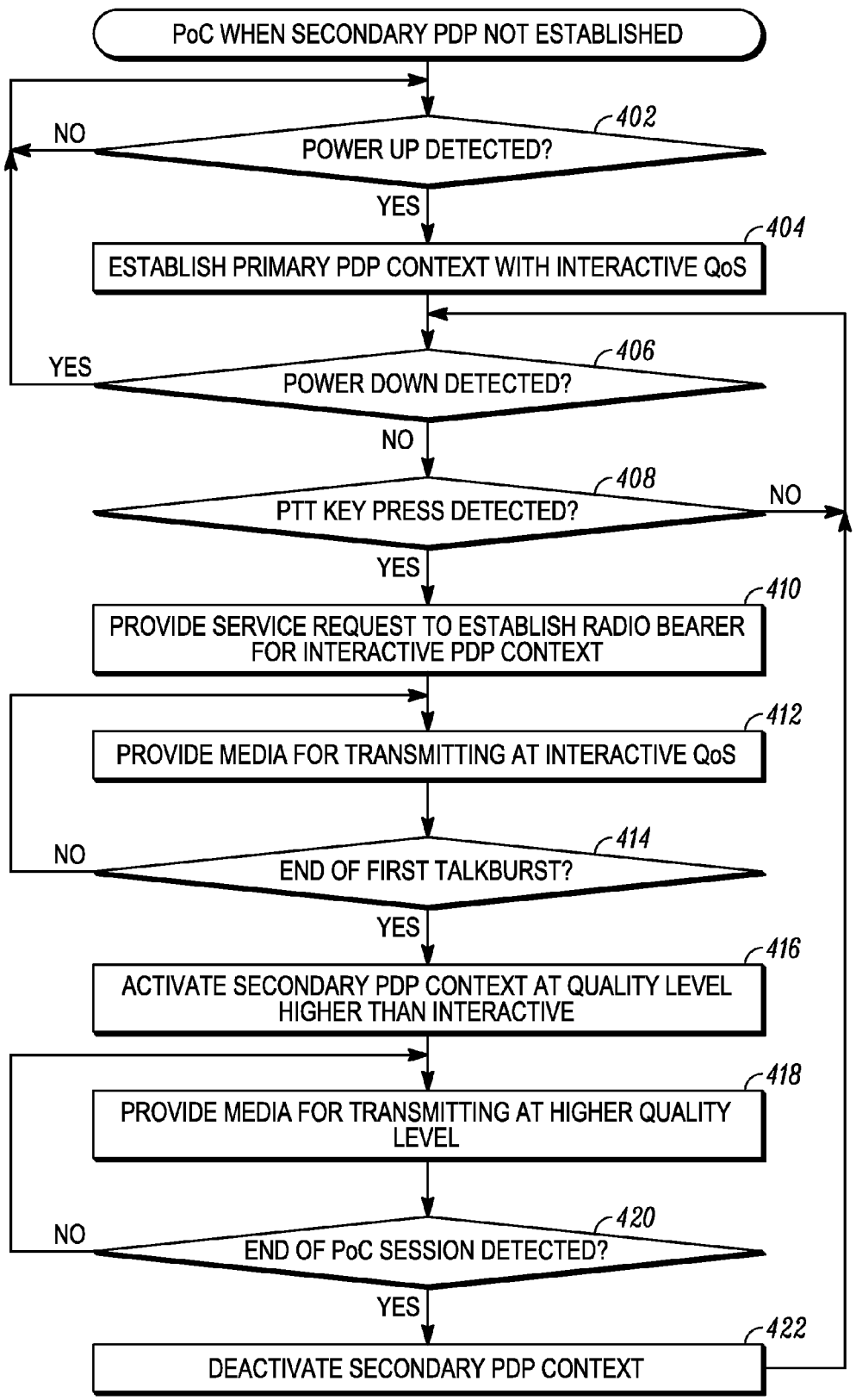
FIG. 4 is a flowchart of the operation of the processor of the wireless communication device when initiating a push-to-talk (PTT) over cellular (PoC) session in accordance with the embodiment of the present invention when the secondary PDP context is not pre-established.

Referring to FIG. 4, a flowchart of the operation of the processor 208 of the wireless communication device 120 when powering up and when initiating a PoC session when the secondary PDP context is not pre-established in accordance with the embodiment of the present invention begins by the processor 208 detecting when the wireless communication device 120 powers up 402. When power up is detected 402, the processor 208 signals the quality level controller 230 to establish the primary PDP context with the QoS class of service at an interactive quality level 404. Thereafter, processing awaits either detection of the wireless communication device 120 powering off 406 or initiation of a PoC session 408.

When the processor 208 detects a keypress 408 of the PTT key 224 indicating the initiation of a PoC session wherein audio conversation will be provided in talkbursts, the processor 208 provides information to the transmitter circuitry 206 to provide a service request to establish a radio bearer for an interactive primary PDP context communication 410 and provides information to the transmit talkburst controller 226 to transmit media in the first talkburst on the primary PDP context (i.e., at the interactive quality level) 412. The media is provided to the transmit talkburst controller 226 for transmission 412 until the end of the first talkburst is detected 414.

When the end of the first talkburst is detected 414, operation of the processor 208 in accordance with the present invention activates the secondary PDP context and signals the quality level controller 230 to set the quality level (e.g., the QoS) of the secondary context at a predetermined quality level higher than the interactive quality level (such as the streaming quality level or the conversational quality level) in the time interval between transmitting the first talkburst and transmitting the second talkburst 416. Thereafter, the information is provided to the transmit talkburst controller 226 to transmit media in the second and subsequent talkbursts on the secondary PDP context at the higher quality level 418 until the end of the PoC conversation is detected 420. In this manner, operation in accordance with the present invention takes advantage of initial pauses in natural conversational progression to establish the secondary context at the preferred QoS in the time interval between the first and subsequent talkbursts by optimizing the first PoC talkburst to transmit at the pre-established primary PDP context to prevent access delay and optimizing subsequent talkbursts for quality by transmitting the subsequent talkbursts in accordance with an activated secondary PDP context having a higher quality level.

When the end of the PoC session is detected 420, the processor 208 signals the quality level controller 230 to deactivate the PDP secondary context 422 and processing awaits either a detection of the wireless communication device 120 being powered off 406 or a keypress of the PTT key 224 indicating the initiation of another PoC session 408.

Figure 5:
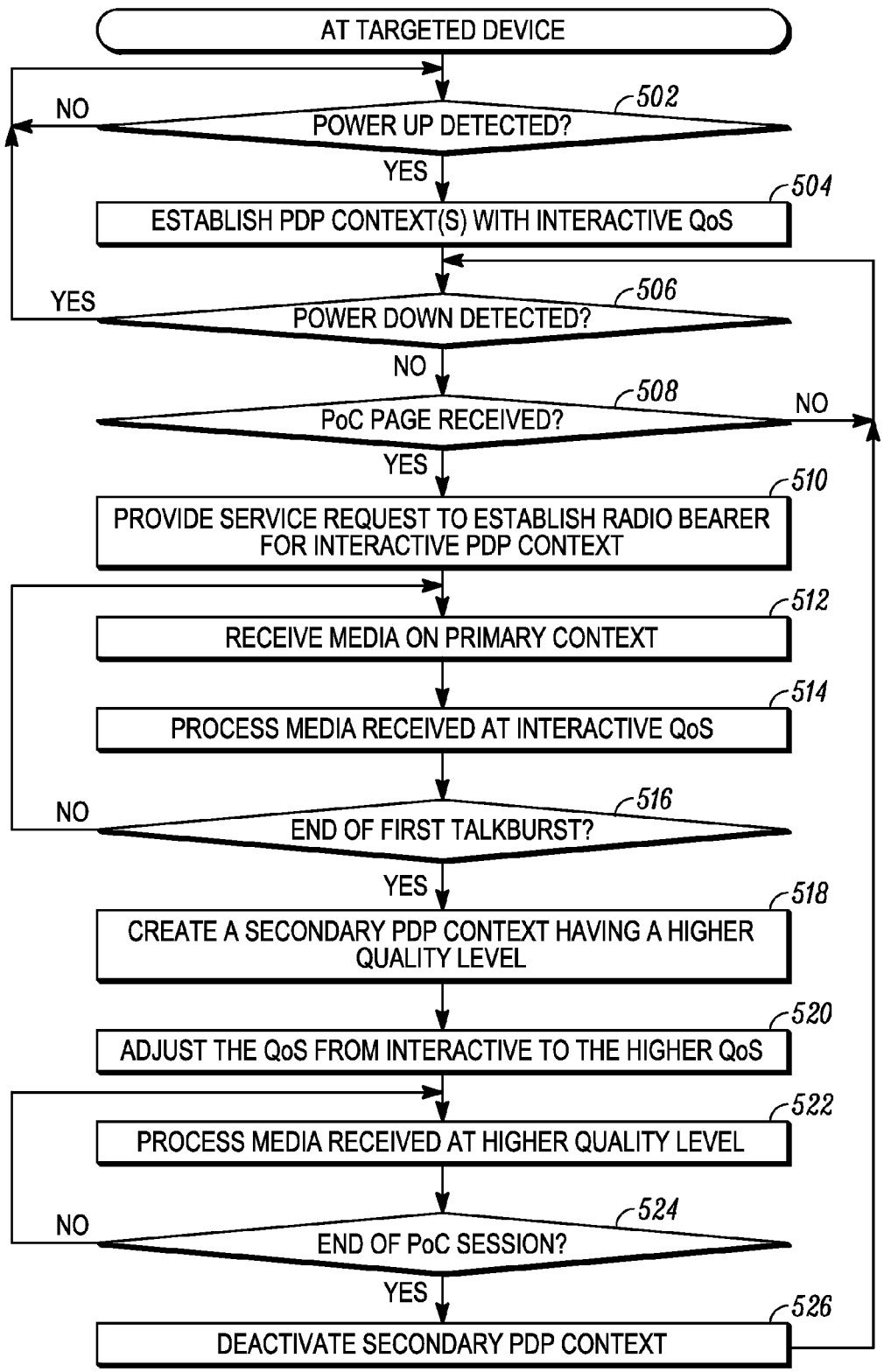
FIG. 5 is a flowchart of the operation of the processor of the wireless communication device when targeted for a PoC session in accordance with the embodiment of the present invention.

Referring to FIG. 5, a flowchart of the operation of the processor 208 at a target wireless communication device 122 which can receive a PoC call in accordance with the embodiment of the present invention begins by the processor 208 detecting when the wireless communication device 122 powers up 502. When power up is detected 502, the processor 208 signals the quality level controller 230 to establish the QoS class of service at an interactive quality level 504. Thereafter, processing awaits either detection of the wireless communication device 122 powering off 506 or reception of a PoC page 508.

When the processor 208 detects reception of a PoC page 508 indicating the initiation of a PoC session wherein audio conversation will be provided in talkbursts, the processor 208 provides information to the transmitter circuitry 206 to provide a service request to establish a radio bearer for an interactive primary PDP context communication 510 and provides information to the receive talkburst controller 228 to receive media for a first talkburst at the primary context (i.e., at the interactive quality level) 512. The media is processed by the receive talkburst controller 228 in accordance with the primary PDP context established 514 (i.e., the interactive quality level) until the end of the first talkburst is detected 516.

When the end of reception of the first talkburst is detected 516, operation of the processor 208 in accordance with the present invention signals the PDP controller 232 during the time interval between receiving the first talkburst and subsequent talkbursts to create a secondary PDP context having the predetermined higher quality level (e.g., the streaming quality level or the conversational quality level) 518 and signals the quality level controller 230 to adjust the quality level (e.g., the QoS) for processing the received talkbursts from the interactive quality level to the predetermined higher quality level 520. Thereafter, the second and subsequent talkbursts received by the receive talkburst controller 228 are processed to recover media therein at the higher quality level 522 until the end of the PoC session is detected 524. In this manner, operation of the target wireless communication device 122 receiving the media of the PoC session in talkbursts in accordance with the present invention also takes advantage of the natural conversational progression to establish the preferred QoS in the time interval between the first and subsequent talkbursts.

When the end of the PoC session is detected 524, the processor 208 signals the quality level controller 230 to deactivate the secondary PDP context from the streaming or conversational quality level to the interactive quality level 526 and processing awaits either a detection of the wireless communication device 122 being powered off 506 or a reception of a PoC page indicating the initiation of another PoC session 508.

The operation of the processor 208 at the target wireless communication device 122 in accordance with the embodiment of the present invention has been described in accordance with the target wireless communication device 122 not having a second PDP context established when receiving a PoC call. If the target wireless communication device 122 has a second PDP context established when receiving a PoC call, the processor 208, at step 510, provides information to the transmitter circuitry 206 to provide a service request to establish a radio bearer for an interactive secondary PDP context communication 510. The processor then provides information to the receive talkburst controller 228 to receive media for the first talkburst at the secondary PDP context interactive quality level 512. At steps 518 and 520, the processor 208 would not create a secondary PDP context (step 518 would be skipped); instead, the processor 208 would adjust the secondary PDP context from interactive to a higher level 520 such as streaming or conversational. When the end of the PoC session is detected 524, the processor 208 adjusts the secondary PDP context from the higher level, such as streaming or conversational, to the interactive quality level 526.

Thus it can be seen that methods and apparati have been provided which advantageously manage PDP contexts that meet QoS requirements for a PoC conversation while simultaneously reducing the impact on access delay. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for providing talkbursts for transmitting during communication sessions comprising the steps of:
   providing a first talkburst for transmitting at a first quality-of-Service (QoS) level;
   adjusting a QoS level from the first QoS level to a second QoS level; and
   providing at least one subsequent talkburst for transmitting at the second QoS level,
      wherein adjusting the QoS level from the first QoS level to a second QoS level occurs during a time interval between providing the first talkburst and the at least one subsequent talkburst.

2. The method of claim 1 wherein the step of adjusting the QoS level comprises the step of adjusting the QoS level from the first QoS level to the second QoS level in response to detecting an end of the first talkburst.

3. The method of claim 1 wherein the step of adjusting the QoS level comprises the step of providing the at least one subsequent talkburst.

4. The method of claim 1 wherein the adjusting step comprises the steps of:
   creating a secondary packet data protocol context having a second QoS level; and
   adjusting the QoS level from the first QoS level to the second QoS level using the secondary packet data protocol context for transmitting talkbursts.

5. The method of claim 1 wherein the step of providing the first talkburst at the first QoS level comprises the step of providing the first talkburst at the first QoS level in response to detecting a request for initiation of a Push To Talk over Cellular session.

6. The method of claim 1 wherein the first QoS level and the second QoS level are quality of service classes selected from the QoS classes of background quality level, interactive quality level, streaming quality level and conversational quality level.

7. The method of claim 6 wherein the first QoS level is an interactive quality level and the second QoS level is a streaming quality level, and wherein the adjusting step comprises adjusting a QoS level from the interactive quality level to the streaming quality level.

8. The method of claim 6 wherein the first QoS level is an interactive quality level and the second QoS level is a conversational quality level, and wherein the adjusting step comprises adjusting a QoS level from the interactive quality level to the conversational quality level.

9. The method of claim 1 further comprising, before the step of providing the first talkburst at the first QoS level, the step of setting a QoS level to the first quality QoS in response to detecting powerup.

10. The method of claim 1 further comprising the step of adjusting the QoS level from the second QoS level to the first QoS level in response to detecting an end of a Push To Talk over Cellular session.

11. A wireless communication device comprising:
transmitter circuitry for receiving talkbursts and generating therefrom radio frequency signals for transmission from the wireless communication device;
a transmit talkburst controller coupled to the transmitter circuitry and generating talkbursts for provision thereto for transmitting therefrom;
a quality level controller coupled to the transmit talkburst controller to control a quality level at which the transmit talkburst controller provides the talkbursts to the transmitter circuitry; and
a processor coupled to the transmit talkburst controller, the quality level controller and the transmitter circuitry and signaling the quality level controller and the transmit talkburst controller to provide a first talkburst to the transmitter circuitry for transmitting at a first quality level, and thereafter signaling the quality level controller to adjust the quality level from the first quality level to a second quality level so that the transmit talkburst controller will provide at least one subsequent talkburst to the transmitter circuitry for transmitting at the second quality level.

12. The wireless communication device of claim 11 wherein the processor signals the quality level controller to adjust the quality level from the first quality level to the second quality level in response to detecting the transmit talkburst controller providing an end of the first talkburst to the transmitter circuitry.

13. The wireless communication device of claim 11 wherein the processor signals the quality level controller to adjust the quality level from the first quality level to the second quality level during a time interval between the transmit talkburst controller providing the first talkburst to the transmitter circuitry and providing the at least one subsequent talkburst thereto.

14. The wireless communication device of claim 11 wherein the quality level controller comprises a packet data protocol controller which creates a secondary packet data protocol context having a second quality level, the quality level controller adjusting the quality level from the first quality level to the second quality level in response to the secondary packet data protocol context created.

15. The wireless communication device of claim 11 further comprising user interface circuitry including a Push To Talk input device, wherein the processor is coupled to the user interface circuitry and signals the transmit talkburst controller to provide the first talkburst at the first quality level in response to detecting a request for initiation of a Push To Talk over Cellular session from the Push To Talk input device.

16. The wireless communication device of claim 11 wherein the first quality level and the second quality level are quality of service classes selected from the quality of service classes of background quality level, interactive quality level, streaming quality level and conversational quality level.

17. The wireless communication device of claim 16 wherein the first quality level is an interactive quality level and the second quality level is a streaming quality level, and wherein the quality level controller adjusts the quality level from the interactive quality level to the streaming quality level.

18. The wireless communication device of claim 16 wherein the first quality level is an interactive quality level and the second quality level is a conversational quality level, and wherein the quality level controller adjusts the quality level from the interactive quality level to the conversational quality level.

19. A method for receiving talkbursts during communication sessions comprising the steps of:
receiving a first talkburst;
processing the first talkburst at a first QoS level;
after processing the first talk burst and before providing a subsequent talk burst, adjusting a quality level from the first QoS level to a second QoS level;
receiving at least one subsequent talkburst; and
processing the at least one subsequent talkburst at the second QoS level.

20. The method of claim 19 wherein the first QoS level is an interactive quality level and the second QoS level is a quality level selected from the group of a conversational quality level and a streaming quality level.

21. A wireless communication device comprising:
receiver circuitry for receiving radio frequency signals and generating information therefrom;
a receive talkburst controller coupled to the receiver circuitry and detecting talkbursts within the information, the receive talkburst controller further decoding the talkbursts detected;
a quality level controller coupled to the receive talkburst controller to control a quality level at which the receive talkburst controller decodes the talkbursts; and
a processor coupled to the receiver circuitry, the receive talkburst controller and the quality level controller and controlling the receive talkburst controller to decode a first talkburst at a first quality level, and thereafter signaling the quality level controller to adjust the quality level from the first quality level to a second quality level, the processor controlling the receive talkburst controller to decode at least one subsequent talkburst at the second quality level.

22. The wireless communication device of claim 21 wherein the first quality level is an interactive quality level and the second quality level is a quality level selected from the group of a conversational quality level and a streaming quality level.

* * * * *